(12) United States Patent
Raval et al.

(10) Patent No.: US 11,425,603 B2
(45) Date of Patent: Aug. 23, 2022

(54) ADAPTIVE MME SELECTION METHOD FOR AN INCOMING UE

(71) Applicant: Parallel Wireless, Inc., Nashua, NH (US)

(72) Inventors: Kartik Shashikant Raval, Pune (IN); Amit Ghadge, Pune (IN); Vivek Pise, Pune (IN); Anoop Gupta, Pune (IN); Rajesh Gupta, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 38 days.

(21) Appl. No.: 16/896,195

(22) Filed: Jun. 8, 2020

(65) Prior Publication Data

US 2020/0389818 A1  Dec. 10, 2020

Related U.S. Application Data

(60) Provisional application No. 62/858,955, filed on Jun. 7, 2019.

(51) Int. Cl.
*H04W 28/08* (2009.01)
*H04W 24/08* (2009.01)
(Continued)

(52) U.S. Cl.
CPC ....... *H04W 28/0958* (2020.05); *H04W 24/08* (2013.01); *H04W 28/0835* (2020.05); *H04W 28/0842* (2020.05); *H04W 28/0925* (2020.05); *H04W 48/18* (2013.01); *H04W 84/042* (2013.01); *H04W 92/045* (2013.01)

(58) Field of Classification Search
CPC . H04W 28/0958; H04W 24/08; H04W 48/18; H04W 28/0842; H04W 28/0925; H04W 28/0835; H04W 92/045; H04W 84/042; H04W 88/08; H04W 24/04; H04W 60/04; H04W 88/14; H04W 24/02; H04W 8/065
See application file for complete search history.

(56) References Cited

U.S. PATENT DOCUMENTS

2014/0301200 A1\* 10/2014 Miura ................... H04W 28/08
370/235
2015/0078173 A1\* 3/2015 Javed ................... H04W 24/08
370/241
(Continued)

*Primary Examiner* — Mazda Sabouri
(74) *Attorney, Agent, or Firm* — Michael Y. Saji; David W. Rouille

(57) ABSTRACT

Systems and methods for MME adaptive selection are described. The method includes: initializing a health checkup algorithm at an eNodeB for each MME connected to as per configuration values; starting a health check timer for each MME; continuing with an Initial Attach procedure for incoming calls based on SAE-Temporary Mobile Subscriber Id (S-TMSI), (Globally Unique MME Identifier) GUMMEI, or capacity/load balancing considerations; on every UE attach attempt, incrementing a total calls count; and on every S1 AP Error Indication/no response from an ME, incrementing a total fail calls count; determining when the health check timer for an MME expires; calculating a failed calls/total calls percentage value. Based on the value of the timer, appropriate action is taken.

8 Claims, 7 Drawing Sheets

(51) Int. Cl.
*H04W 48/18* (2009.01)
*H04W 92/04* (2009.01)
*H04W 84/04* (2009.01)

(56) References Cited

U.S. PATENT DOCUMENTS

| | | |
|---|---|---|
| 2015/0109995 A1 | 4/2015 | Mathai et al. |
| 2015/0195706 A1* | 7/2015 | Luft ................. H04W 4/90 |
| | | 370/216 |
| 2015/0215832 A1 | 7/2015 | Fitzpatrick |
| 2016/0080982 A1* | 3/2016 | Bovo ............... H04L 41/5009 |
| | | 370/252 |
| 2016/0277926 A1* | 9/2016 | Molina ............. H04W 12/12 |
| 2016/0381580 A1* | 12/2016 | Kwan ............. H04L 41/5009 |
| | | 370/252 |
| 2019/0028932 A1* | 1/2019 | Gunyel ............ H04W 36/0022 |
| 2019/0059007 A1* | 2/2019 | Chockalingam ........ H04L 67/12 |
| 2020/0084711 A1 | 3/2020 | Liu et al. |
| 2020/0107257 A1 | 4/2020 | Ke et al. |

\* cited by examiner

ADAPTIVE MME SELECTION METHOD FOR AN INCOMING UE

CROSS-REFERENCE TO RELATED APPLICATIONS

This application claims priority under 35 U.S.C. § 119(e) to U.S. Provisional Pat. App. No. 62/858,955, filed Jun. 7, 2019, titled "Adaptive MME Selection Method For An Incoming UE," which is hereby incorporated by reference in its entirety for all purposes. The present application also hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584.

BACKGROUND

In 4G networks, the deployment is such that multiple different core networks are connected to a given eNodeB for redundancy or load division purpose. It is the responsibility of eNodeB to select one of the core network for an incoming UE.

SUMMARY

In certain networks, there is a possibility wherein the MME is not connected (or down intermittently) to Core network (PCRF, PGW etc.) but connectivity between eNodeB and MME (S1 link) is always UP, or when there is a fault at MME which leads it to reject the calls even though S1 link is UP. Hereby, it is called 'affected' MME.

eNodeB may select the affected MME for UE attachment procedure based on S-TMSI, GUMMEI or capacity/load balancing considerations. However, due to above reasons, call gets rejected without eNodeB taking in any closed loop feedback for the same, i.e. it keeps on selecting the same MME again and again based on above parameters. Lot of calls thus fail and only the manual intervention by the operator can rectify the solution.

This invention proposes a new method of core network selection at the base station. This would help avoid many call failure scenarios at the core network which are not known at eNodeB. Also, the method is adaptive such that the eNodeB algorithm is changed upon detecting that the core network has failures and also when it is back to business.

Systems and methods for MME adaptive selection are described. In one embodiment, a method for providing Mobility Management Entity (MME) adaptive selection includes: initializing a health checkup algorithm at an eNodeB for each MME connected to as per configuration values; starting a health check timer for each MME; continuing with an Initial Attach procedure for incoming calls based on SAE-Temporary Mobile Subscriber Id (S-TMSI), (Globally Unique MME Identifier) GUMMEI, or capacity/load balancing considerations; on every UE attach attempt, incrementing a total calls count; and on every Slap Error Indication/no response from an ME, incrementing a total fail calls count.

The method may further include determining when the health check timer for an MME expires; calculating a failed calls/total calls percentage value; determining if the value meets a high threshold; when the value does meet the high threshold, then declaring the MME unhealthy, resetting all counter values associated with the unhealthy MME, rebuild an S1AP connection to the unhealthy MME, and enabling round-robin selection for the unhealthy MME but relative capacity based selection for other healthy MMES; when the value does not meet the high threshold, then determining if the value meets a low threshold; and when the value does meet the low threshold, then declaring the MME healthy again, resetting all counters associated with the MME, resuming selecting the MME based on S-TMSI, GUMMEI or capacity/load balancing considerations.

In another embodiment a method for providing Mobility Management Entity (MME) adaptive selection includes: initializing a health checkup algorithm at an eNodeB for each MME connected to as per configuration values; starting a health check timer for each MME; continuing with an Initial Attach procedure for incoming calls based on SAE-Temporary Mobile Subscriber Id (S-TMSI), (Globally Unique MME Identifier) GUMMEI, or capacity/load balancing considerations; on every UE detach, incrementing a total calls count; and on every UE Detach, checking if UE had setup any bearer.

The method may further include: determining when the health check timer for an MME expires; calculating a failed calls/total calls percentage value; determining if the value meets a high threshold; when the value does meet the high threshold, then declaring the MME unhealthy, resetting all counter values associated with the unhealthy MME, rebuild an S1AP connection to the unhealthy MME, and enabling round-robin selection for the unhealthy MME but relative capacity based selection for other healthy MMES; when the value does not meet the high threshold, then determining if the value meets a low threshold; and when the value does meet the low threshold, then declaring the MME healthy again, resetting all counters associated with the MME, resuming selecting the MME based on S-TMSI, GUMMEI or capacity/load balancing considerations.

DETAILED DESCRIPTION

Figure 1A:
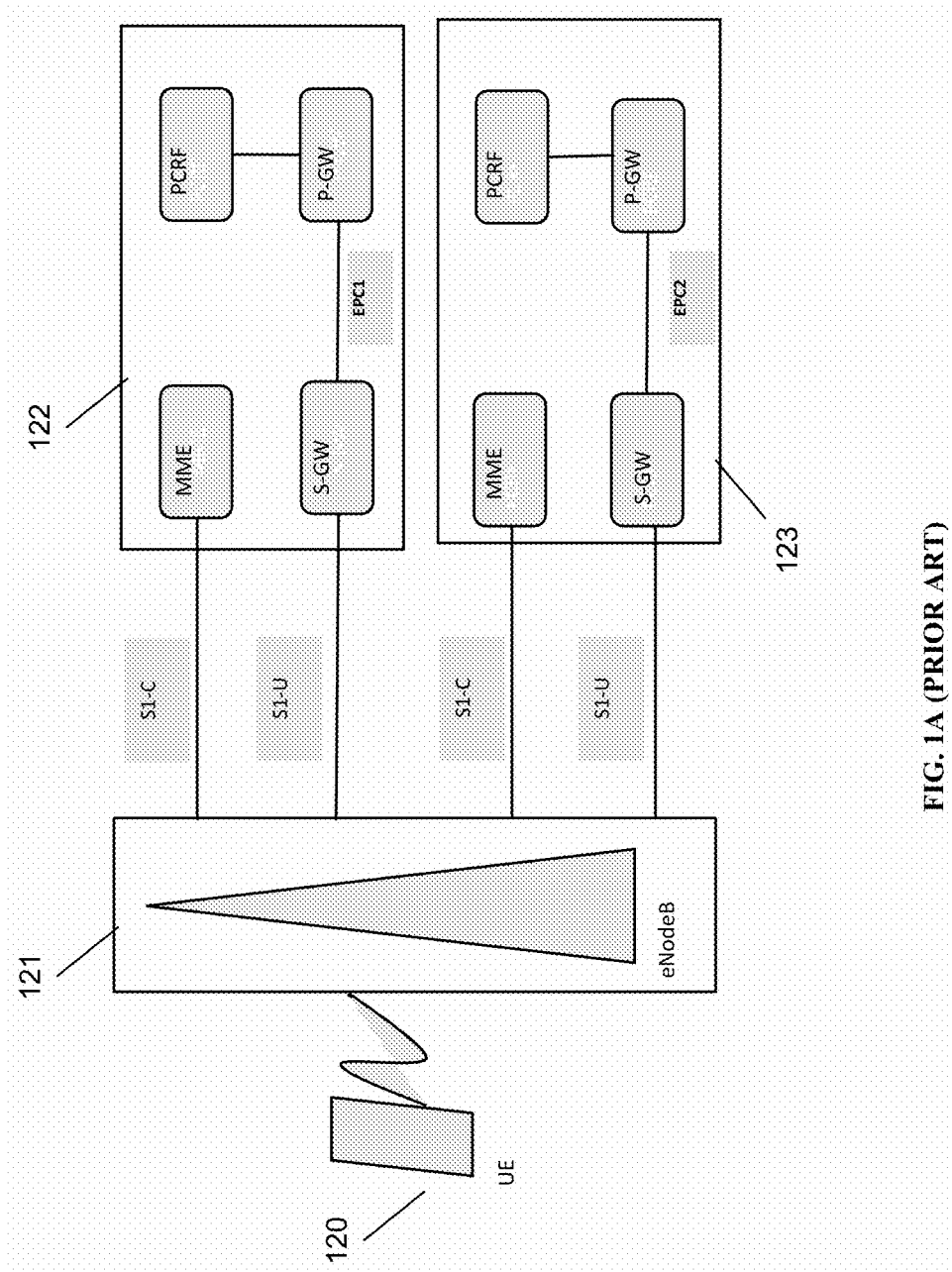
FIG. 1A is an architecture diagram of a prior art LTE architecture.

FIG. 1A shows a network architecture in accordance with the prior art. A User Equipment (UE) 120 is in wireless communication with an eNodeB 121. The eNodeB may be connected to two LTE core networks 122 and 123, EPC1 and EPC2, and may be connected accordingly to an MME in EPC1 and an MME in EPC2. However, the eNodeB may not be able to select the appropriate MME in all cases, as described herein.

Figure 1B:
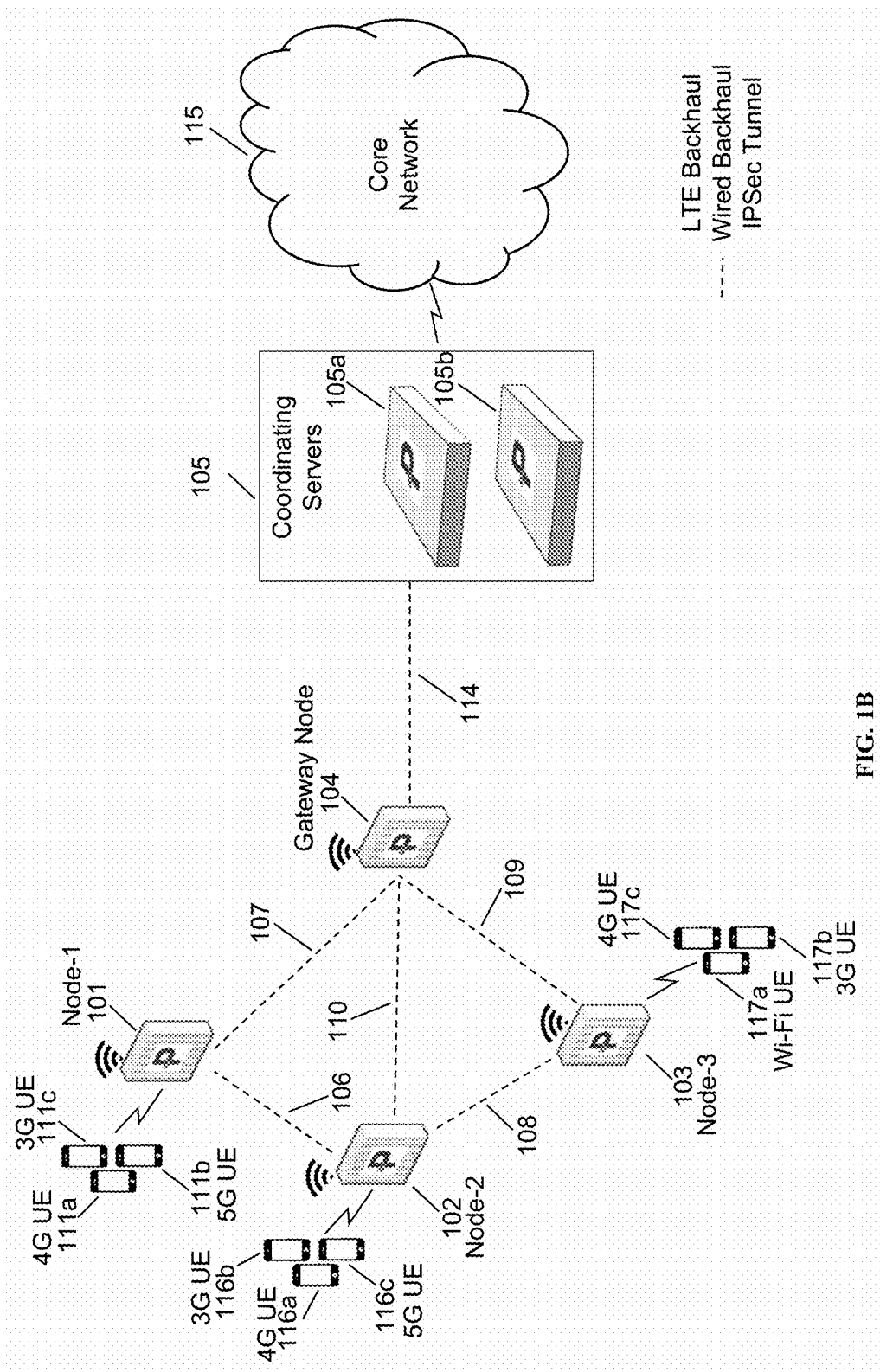
FIG. 1B is an architecture diagram of an enhanced architecture showing multiple base stations, in accordance with some embodiments.
Figure 2:
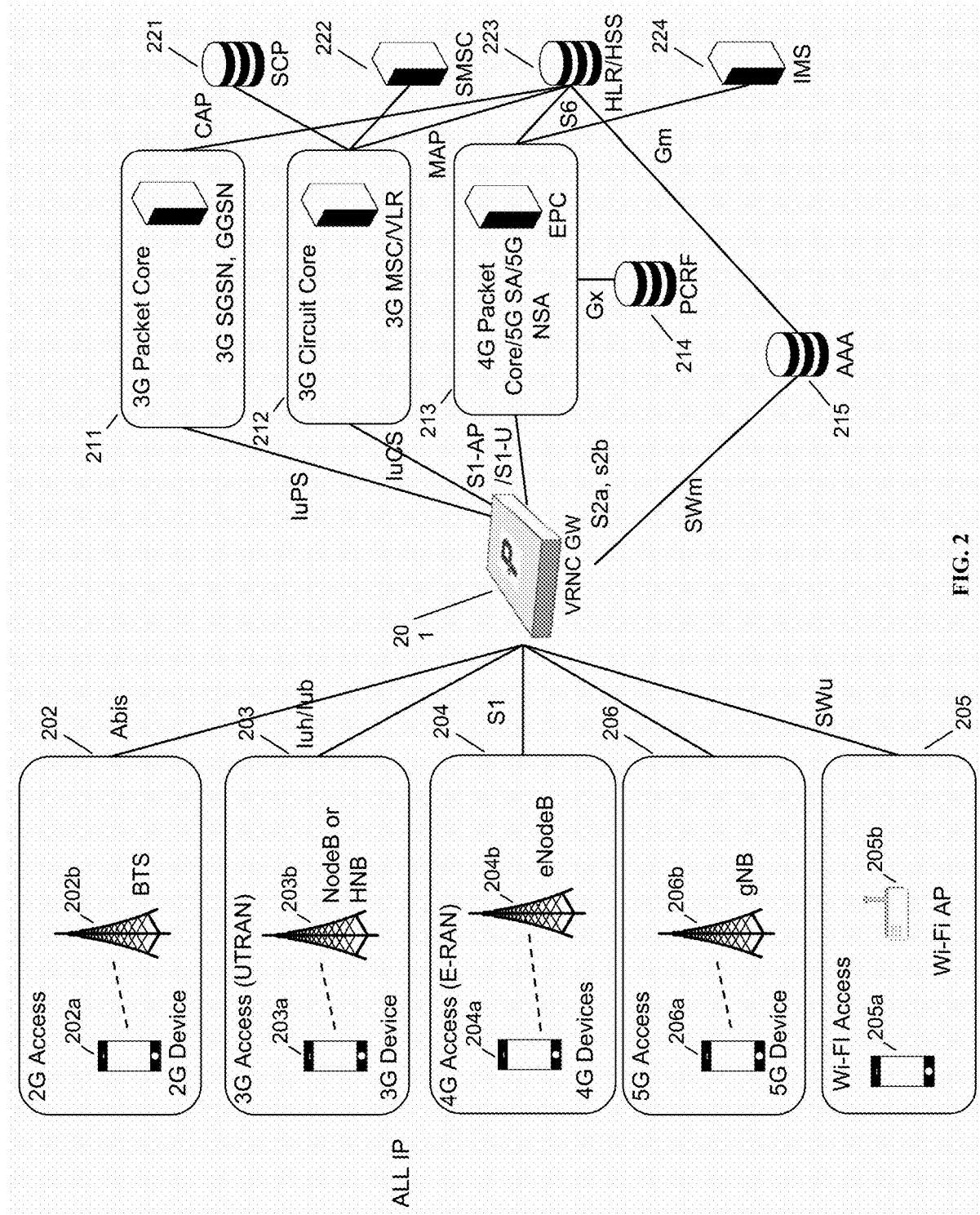
FIG. 2 is an architecture diagram of an enhanced architecture showing multiple radio access technologies (RATs) and a virtual radio network controller gateway (VRNC GW), in accordance with some embodiments.

FIG. 1B is a network diagram in accordance with some embodiments. In some embodiments, as shown in FIG. 1B, a mesh node 1 101, a mesh node 2 102, and a mesh node 3 103 are any G RAN nodes. Base stations 101, 102, and 103 form a mesh network establishing mesh network links 106, 107, 108, 109, and 110 with a base station 104. The mesh network links are flexible and are used by the mesh nodes to route traffic around congestion within the mesh network as needed. The base station 104 acts as gateway node or mesh gateway node, and provides backhaul connectivity to a core network to the base stations 101, 102, and 103 over backhaul link 114 to a coordinating server(s) 105 and towards core network 115. The Base stations 101, 102, 103, 104 may also provide eNodeB, NodeB, Wi-Fi Access Point, Femto Base Station etc. functionality, and may support radio access technologies such as 2G, 3G, 4G, 5G, Wi-Fi etc. The base stations 101, 102, 103 may also be known as mesh network nodes 101, 102, 103.

The coordinating servers 105 are shown as two coordinating servers 105a and 105b. The coordinating servers 105a and 105b may be in load-sharing mode or may be in active-standby mode for high availability. The coordinating servers 105 may be located between a radio access network (RAN) and the core network and may appear as core network to the base stations in a radio access network (RAN) and a single eNodeB to the core network, i.e., may provide virtualization of the base stations towards the core network. As shown in FIG. 1B, various user equipments 111a, 111b, 111c are connected to the base station 101. The base station 101 provides backhaul connectivity to the user equipments 111a, 111b, and 111c connected to it over mesh network links 106, 107, 108, 109, 110 and 114. The user equipments may be mobile devices, mobile phones, personal digital assistant (PDA), tablet, laptop etc. The base station 102 provides backhaul connection to user equipments 112a, 112b, 112c and the base station 103 provides backhaul connection to user equipments 113a, 113b, and 113c. The user equipments 111a, 111b, 111c, 112a, 112b, 112c, 113a, 113b, 113c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 111a, 111b, 111c, 112a, 112b, 112c, 113a, 113b, and 113c, the uplink 114 may get congested under certain circumstances. As described above, to continue the radio access network running and providing services to the user equipments, the solution requires prioritizing or classifying the traffic based at the base stations 101, 102, 103. The traffic from the base stations 101, 102, and 103 to the core network 115 through the coordinating server 105 flows through an IPSec tunnel terminated at the coordinating server 105. The mesh network nodes 101, 102, and 103 adds IP Option header field to the outermost IP Header (i.e., not to the pre-encapsulated packets). The traffic may from the base station 101 may follow any of the mesh network link path such as 107, 106-110, 106-108-109 to reach to the mesh gateway node 104, according to a mesh network routing protocol.

Figure 3:
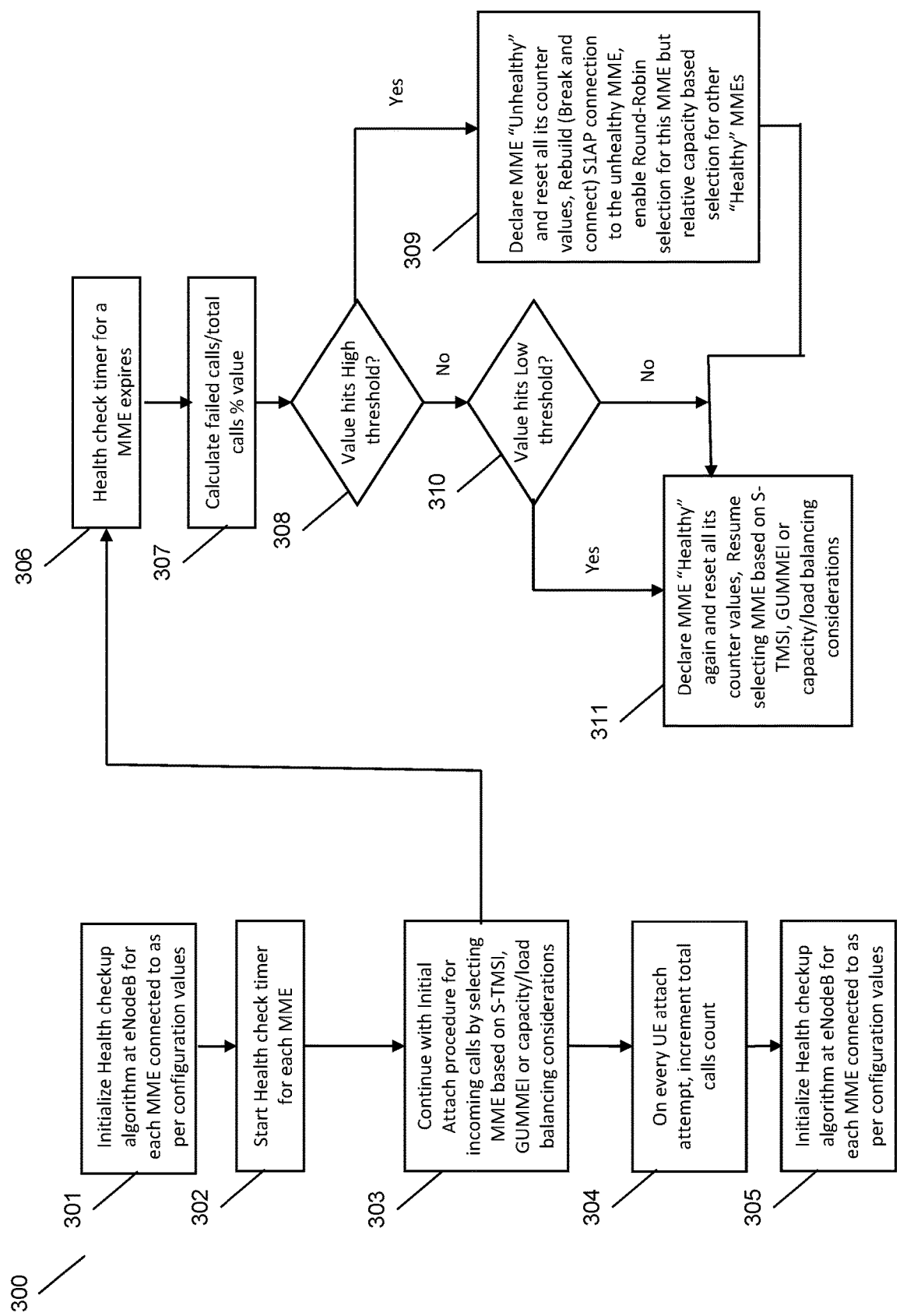
FIG. 3 is an exemplary flow diagram showing MME adaptive selection, in accordance with some embodiments.
Figure 4:
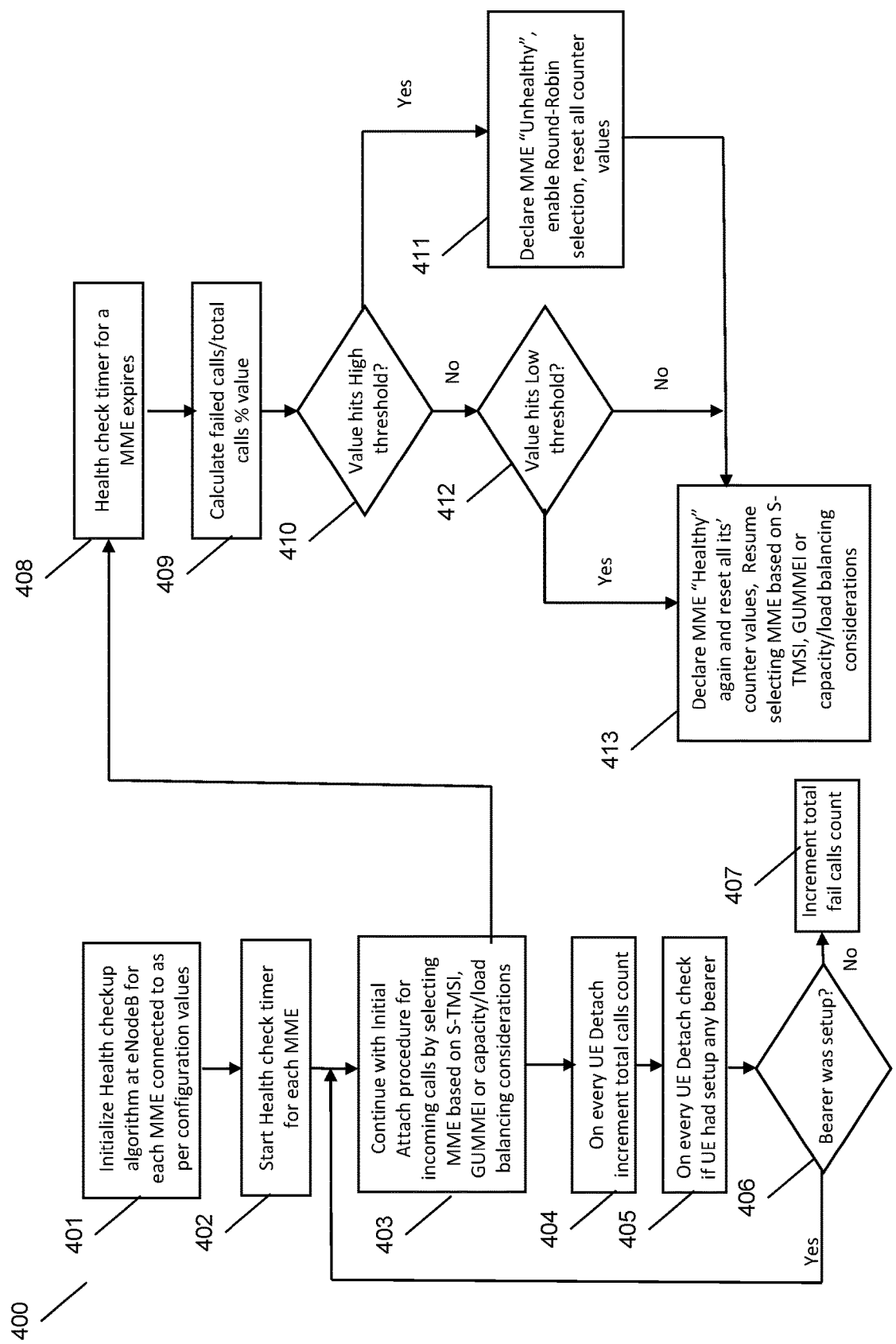
FIG. 4 is a further exemplary flow diagram showing MME adaptive selection, in accordance with some embodiments.

As shown in FIGS. 3 and 4, it is proposed that eNodeB runs a closed loop adaptive MME selection mechanism to avoid the affected MME for a new call and thus divert the new calls to other healthy MMEs/core networks. Also, a mechanism is proposed whereby eNodeB monitors the 'health' of MME and makes changes to the MME selection algorithm dynamically based on this input.

Detection of MME Health:

For a given period, if the calls diverted towards it are not getting any response or if the eNodeB consistently gets S1AP Error Indication from MME for the new calls, it can be deduced that there is some problem with the MME and is now marked as unhealthy.

eNodeB would run health check algorithm for each MME connected to it and based on percentage S1 AP error indications received from MME.

For a specific set of UE NAS establishment scenarios (i.e. Attach, Service Request, TAU with active flag), it is expected that MME would establish the user plane by sending S1AP Initial Context Setup message to eNodeB. For a given MME, the eNodeB would monitor the bearer establishment ratio for the new calls and if it is found to be consistently very low for a given period, it is deduced that there is problem with the core network and MME is now marked as unhealthy.

eNodeB would run health check algorithm for each MME connected to it and based on percentage bearer setup.

Following configuration parameter per MME connection would be maintained at eNodeB for cases 1 & 2:—

High threshold percentage at which MME would be assumed unhealthy

Low threshold percentage at which MME would be assumed healthy

Health Check Timer to check MME health against high/low threshold values. Current values would be reset on this timer re-start.

MME Selection Algorithm Change:

Once any of the MMEs in the pool is marked as unhealthy, the eNodeB would make changes in the MME selection algorithm. It would follow mix approach for MME selection as performing load balanced selection of MME based on relative capacity (as per the specification) among healthy MMEs and would fall back to Round-Robin selection among unhealthy MME(s).

Flow Diagrams

The flow diagrams of FIGS. 3 and 4 describe the overall procedure for MME adaptive selection. The flow diagram of FIG. 3 represents S1AP Error Indication detection case wherein the flow diagram of FIG. 4 represents Bearer failure case.

FIG. 3 depicts one embodiment of a method 300 for providing Mobility Management Entity (MME) adaptive selection. Method 300 begins with processing block 301 which discloses initializing a health checkup algorithm at an eNodeB for each MME connected to as per configuration values. Processing block 302 shows starting a health check timer for each MME.

Processing block 303 recites continuing with an Initial Attach procedure for incoming calls based on SAE-Temporary Mobile Subscriber Id (S-TMSI), (Globally Unique MME Identifier) GUMMEI, or capacity/load balancing considerations.

Processing block 304 discloses on every UE attach attempt, incrementing a total calls count. As shown in processing block 305 on every Slap Error Indication/no response from an ME, incrementing a total fail calls count.

Processing continues with processing block 306 which discloses that the health check timer for an MME started in processing block 302 expires.

Processing block 307 states calculating a failed calls/total calls percentage value.

Decision block 308 recites determining if the value meets a high threshold. When the value does hit the high threshold, processing block 309 is executed. When the value does not hit the high threshold, decision block 310 is executed.

Processing block 309 discloses declaring the MME unhealthy, resetting all counter values associated with the unhealthy MME, rebuild an S1AP connection to the unhealthy MME, and enabling round-robin selection for the unhealthy MME but relative capacity based selection for other healthy MMEs.

Decision block 310 recites determining if the value meets a low threshold. When the value does hit the low threshold, processing block 311 is executed. When the value does not hit the high threshold, processing block 311 is executed.

Processing block 311 discloses declaring the MME healthy again, resetting all counters associated with the MME, resuming selecting the MME based on S-TMSI, GUMMEI or capacity/load balancing considerations. The method then ends.

FIG. 4 depicts one embodiment of a method 400 for providing Mobility Management Entity (MME) adaptive selection. Method 400 begins with processing block 401 which discloses initializing a health checkup algorithm at an eNodeB for each MME connected to as per configuration values. Processing block 402 shows starting a health check timer for each MME.

Processing block 403 recites continuing with an Initial Attach procedure for incoming calls based on SAE-Temporary Mobile Subscriber Id (S-TMSI), (Globally Unique MME Identifier) GUMMEI, or capacity/load balancing considerations.

Processing block 404 discloses on every UE detach, incrementing a total calls count. As shown in processing block 405 on every. Processing block 405 discloses on every UE detach, check in the UE had setup any bearer.

Decision block 406 determines if a bearer was setup. When a bearer was set up, processing continues with going back to processing block 403 et seq. when a bearer was not setup, processing continues with processing block 407 which states increasing the total fail calls count.

Processing continues with processing block 408 which discloses that the health check timer for an MME started in processing block 402 expires.

Processing block 409 states calculating a failed calls/total calls percentage value.

Decision block 410 recites determining if the value meets a high threshold. When the value does hit the high threshold, processing block 411 is executed. When the value does not hit the high threshold, decision block 412 is executed.

Processing block 411 discloses declaring the MME unhealthy, enabling round-robin MME selection and resetting all counter values Decision block 412 recites determining if the value meets a low threshold. When the value does hit the low threshold, processing block 413 is executed. When the value does not hit the high threshold, processing block 411 is executed.

Processing block 413 discloses declaring the MME healthy again, resetting all counters values, resuming selecting the MME based on S-TMSI, GUMMEI or capacity/load balancing considerations. The method then ends.

Figure 5:
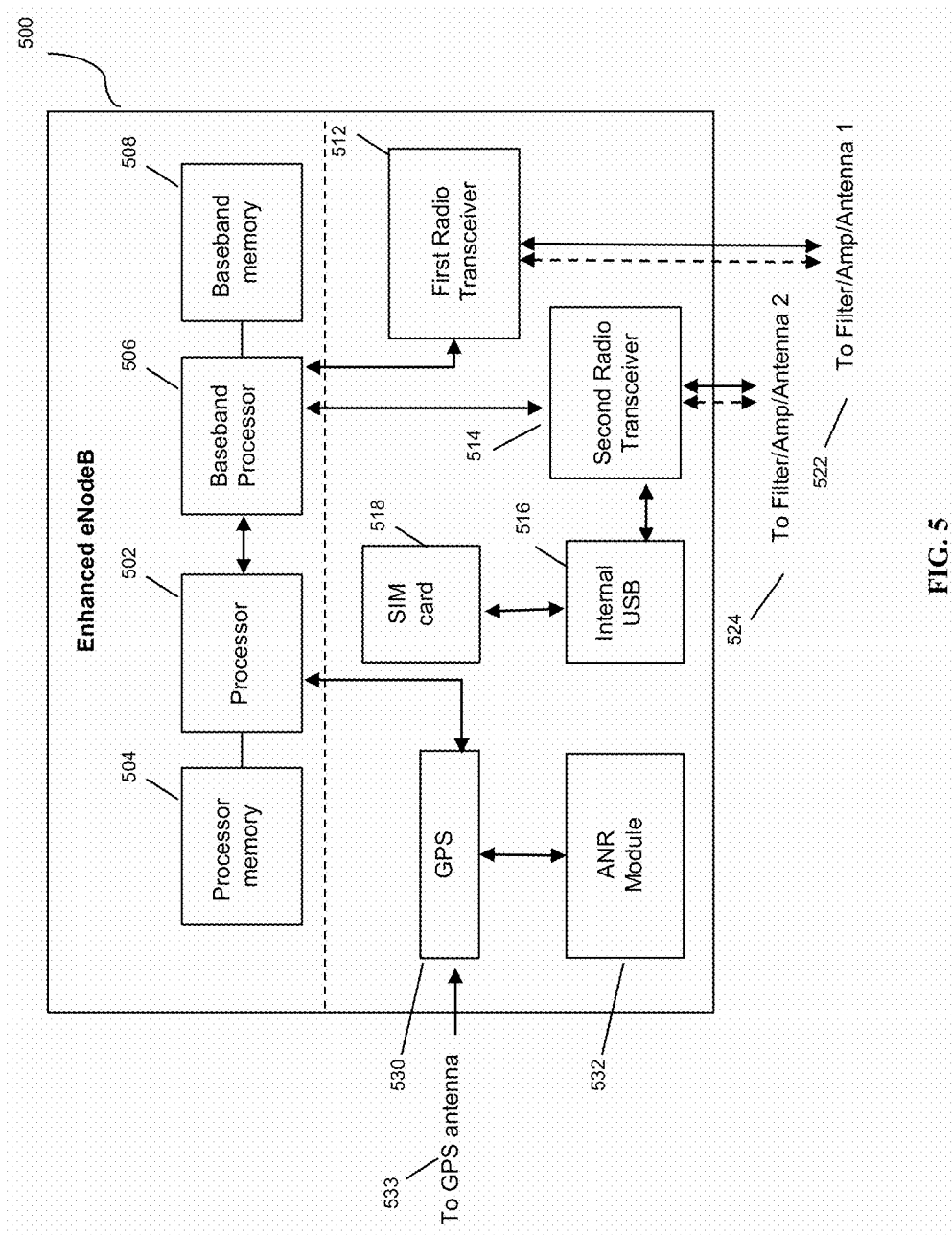
FIG. 5 is a diagram of an enhanced eNodeB, in accordance with some embodiments.

FIG. 5 is an enhanced eNodeB for performing the methods described herein, in accordance with some embodiments. Mesh network node 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 6:
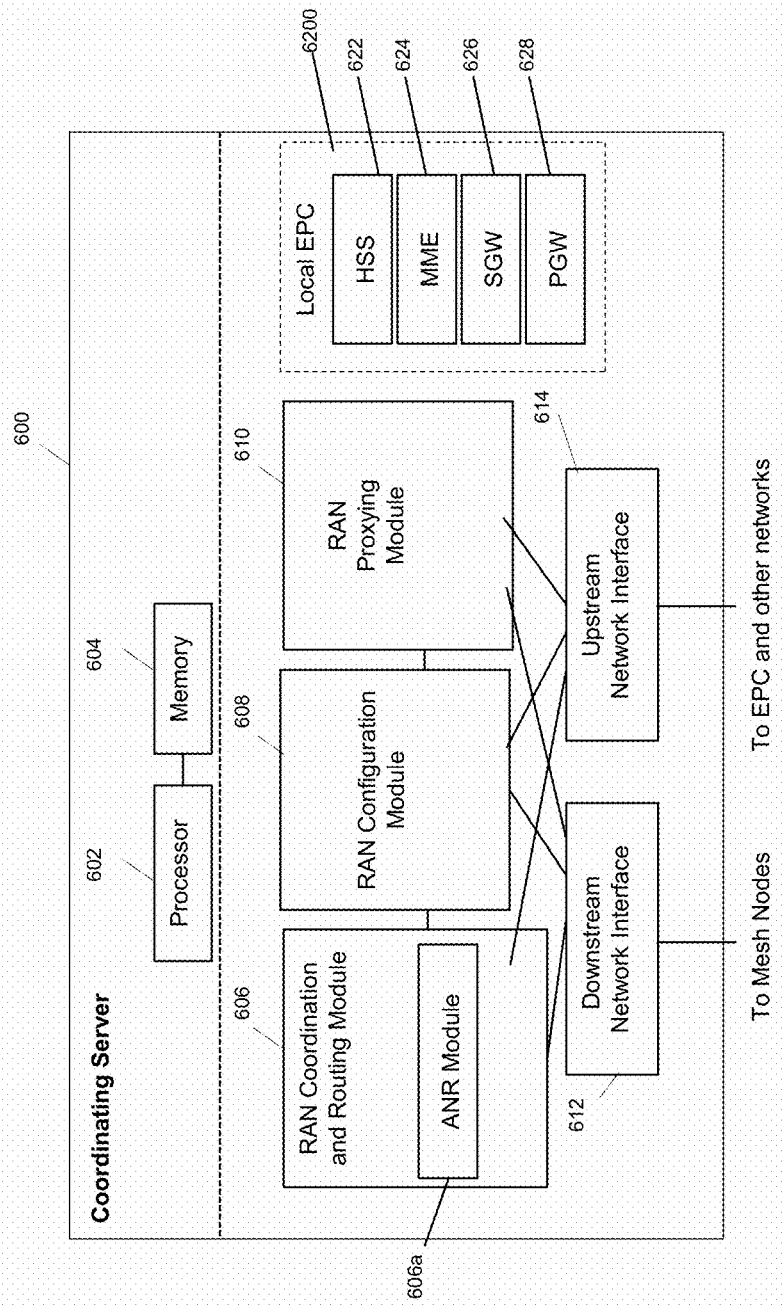
FIG. 6 is a block diagram of a coordinating server, in accordance with some embodiments

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the present disclosure could be adapted for use with various core network embodiments. Different RAT core network nodes could be supported. Examples include: another 4G core network node, such as SGW, PGW, AAA; a 3G core network node, such as PDSN, SGSN; a 5G core network node, such as Authentication Server Function (AUSF), Core Access and Mobility Management Function (AMF), Structured Data Storage network function (SDSF), Unstructured Data Storage network function (UDSF), Network Exposure Function (NEF), NF Repository Function (NRF), Policy Control function (PCF), or Session Management Function (SMF). A fail count could be used to detect unhealth of any of these nodes, and timers could be set, and the timers could be reset upon the nodes returning to health.

In some embodiments, the present disclosure could be adapted for use with additional core network embodiments, including: multi operator core network (MOCN) or multi operator RAN (MORAN); cloud virtualized core network nodes; 5G standalone or non-standalone; and/or heterogeneous core networks.

In some embodiments, the monitoring method for monitoring the health of a node could be run on another node, or on more than one node. For example, instead of or in addition to an eNodeB, the monitoring process could be run on another node, such as the PGW, with an established flow sequence with the MME (or any specific node in question). The monitoring process could be run continuously or periodically or intermittently. The monitoring process could utilize (piggyback) on an existing call flow, in some embodiments, using success or failure of that flow to assess health or unhealth. The monitoring process could set up or utilize a new heartbeat call flow, in some embodiments. In some embodiments, the monitoring process could be an independent process and could be situated in any position in the network, including colocated with the node, or as a virtualized or containerized process or machine, in some embodiments.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing Mobility Management Entity (MME) adaptive selection, comprising:
    initializing a health checkup algorithm at an eNodeB for each MME connected to as per configuration values;
    starting a health check timer for each MME;
    continuing with an Initial Attach procedure for incoming calls based on SAE-Temporary Mobile Subscriber Id (S-TMSI), (Globally Unique MME Identifier) GUMMEI, or capacity/load balancing considerations;
    on every UE attach attempt, incrementing a total calls count;

on every S1ap Error Indication/no response from an ME, incrementing a total fail calls count;

calculating a failed calls/total calls ratio;

performing an action based on the failed calls/total calls ratio;

determining if the failed calls/total calls ratio value meets a high threshold; and when the failed calls/total calls ratio value does meet the high threshold then declaring the MME unhealthy, resetting all counter values associated with the unhealthy MME, rebuild an S1AP connection to the unhealthy MME, and enabling round-robin selection for the unhealthy MME but relative capacity based selection for other healthy MMEs.

2. The method of claim 1 further comprising determining when the health check timer for an MME expires.

3. The method of claim 1 further comprising-determining if the failed calls/total calls ratio value meets a low threshold.

4. The method of claim 3 further comprising when the failed calls/total calls ratio value does meet the low threshold, then declaring the MME healthy again, resetting all counters associated with the MME, resuming selecting the MME based on S-TMSI, GUMMEI or capacity/load balancing considerations.

5. A method for providing Mobility Management Entity (MME) adaptive selection, comprising:

initializing a health checkup algorithm at an eNodeB for each MME connected to as per configuration values;

starting a health check timer for each MME;

continuing with an Initial Attach procedure for incoming calls based on SAE-Temporary Mobile Subscriber Id (S-TMSI), (Globally Unique MME Identifier) GUMMEI, or capacity/load balancing considerations;

on every UE attach attempt, incrementing a total calls count;

on every S1ap Error Indication/no response from an ME, incrementing a total fail calls count;

calculating a failed calls/total calls ratio;

performing an action based on the failed calls/total calls ratio;

determining if the failed calls/total calls ratio value meets a low threshold; and when the failed calls/total calls ratio value does meet the low threshold, then declaring the MME healthy again, resetting all counters associated with the MME, resuming selecting the MME based on S-TMSI, GUMMEI or capacity/load balancing considerations.

6. The method of claim 5 further comprising determining when the health check timer for an MME expires.

7. The method of claim 5 further comprising determining if the failed calls/total calls ratio value meets a high threshold.

8. The method of claim 7 further comprising when the failed calls/total calls ratio value does meet the high threshold then declaring the MME unhealthy, resetting counter values associated with the unhealthy MME, rebuild an S1AP connection to the unhealthy MME, and enabling round-robin selection for the unhealthy MME but relative capacity based selection for other healthy MMEs.

* * * * *